Oct. 28, 1969    I. L. KAPLAN    3,474,914
BAR HANDLING DEVICE

Filed July 26, 1965    12 Sheets-Sheet 1

FIG. I

INVENTOR.
IRVING LEONARD KAPLAN
BY    Fay & Fay
ATTORNEYS

INVENTOR.
IRVING LEONARD KAPLAN
BY
Fay & Fay
ATTORNEYS

Oct. 28, 1969    I. L. KAPLAN    3,474,914
BAR HANDLING DEVICE

Filed July 26, 1965    12 Sheets-Sheet 3

INVENTOR.
IRVING LEONARD KAPLAN
BY    *Fay & Fay*

ATTORNEYS

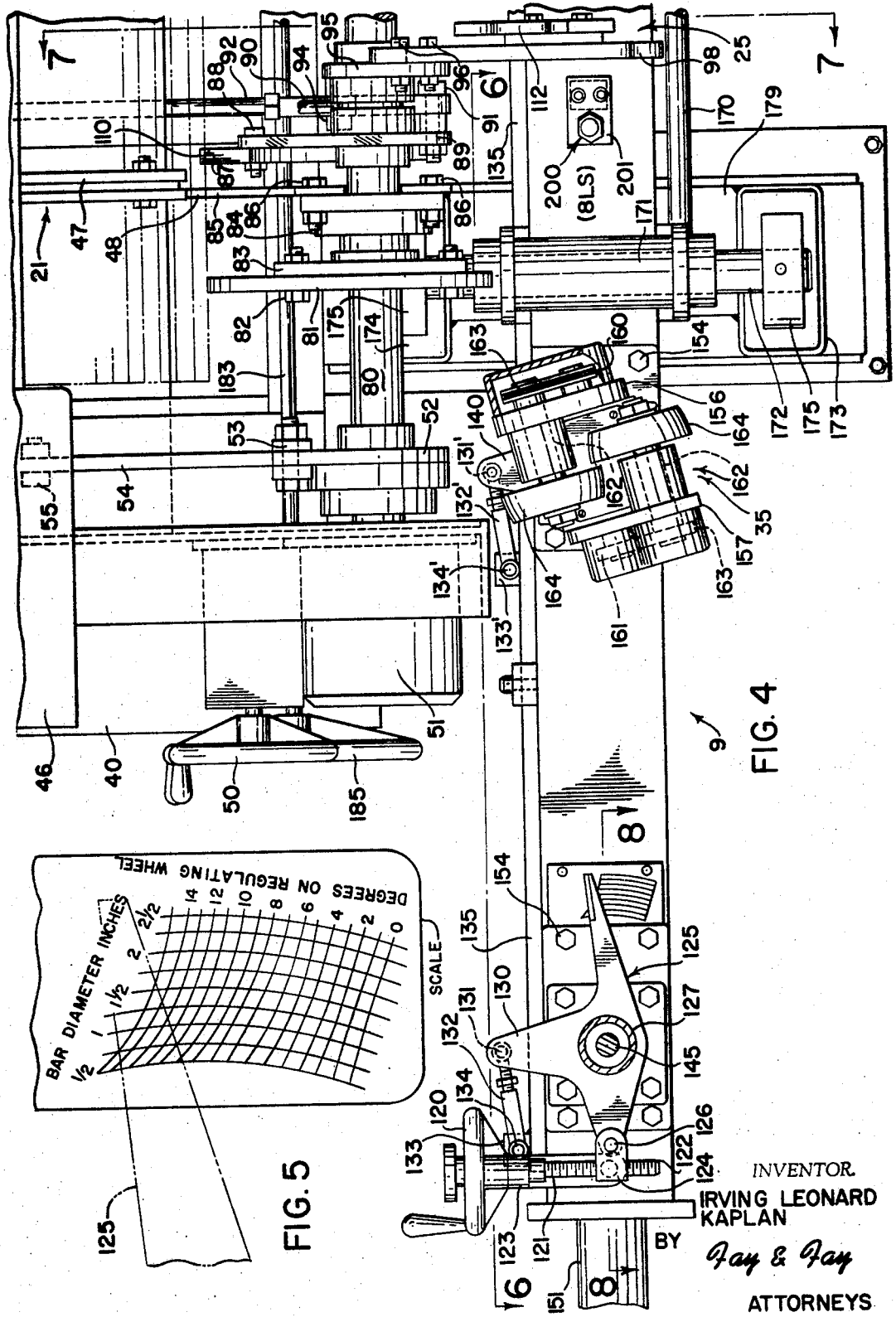

INVENTOR.
IRVING LEONARD KAPLAN
BY Fay & Fay
ATTORNEYS

Oct. 28, 1969    I. L. KAPLAN    3,474,914
BAR HANDLING DEVICE
Filed July 26, 1965    12 Sheets-Sheet 6

INVENTOR.
IRVING LEONARD KAPLAN
BY
Fay & Fay
ATTORNEYS

INVENTOR.
IRVING LEONARD KAPLAN
BY Fay & Fay
ATTORNEYS

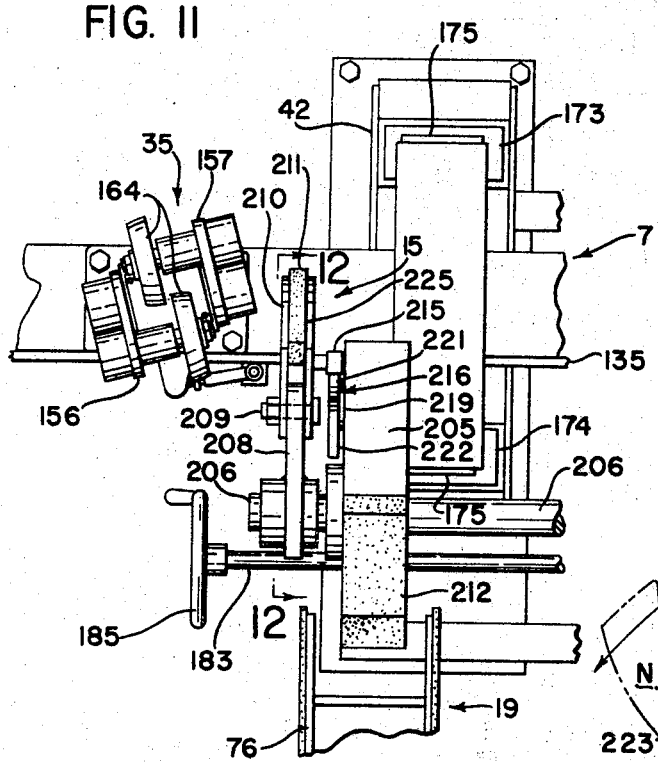
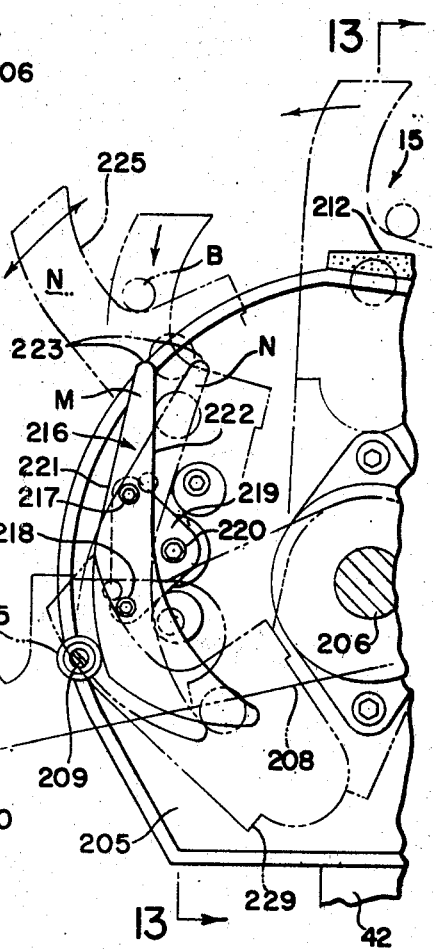
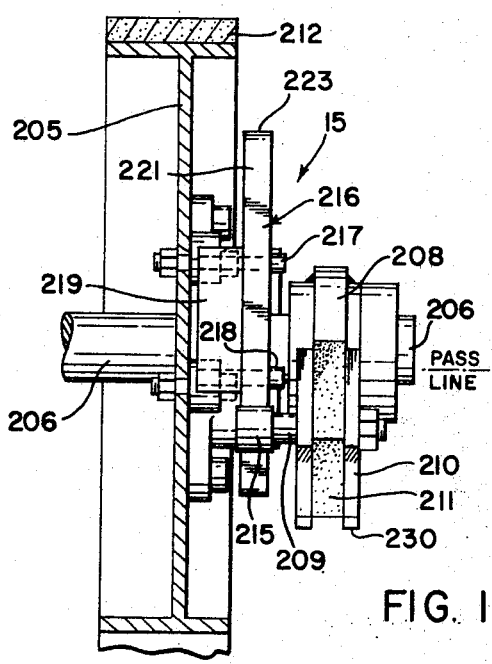

Oct. 28, 1969     I. L. KAPLAN     3,474,914

BAR HANDLING DEVICE

Filed July 26, 1965     12 Sheets-Sheet 9

INVENTOR.
IRVING LEONARD KAPLAN
BY *Fay & Fay*

ATTORNEYS

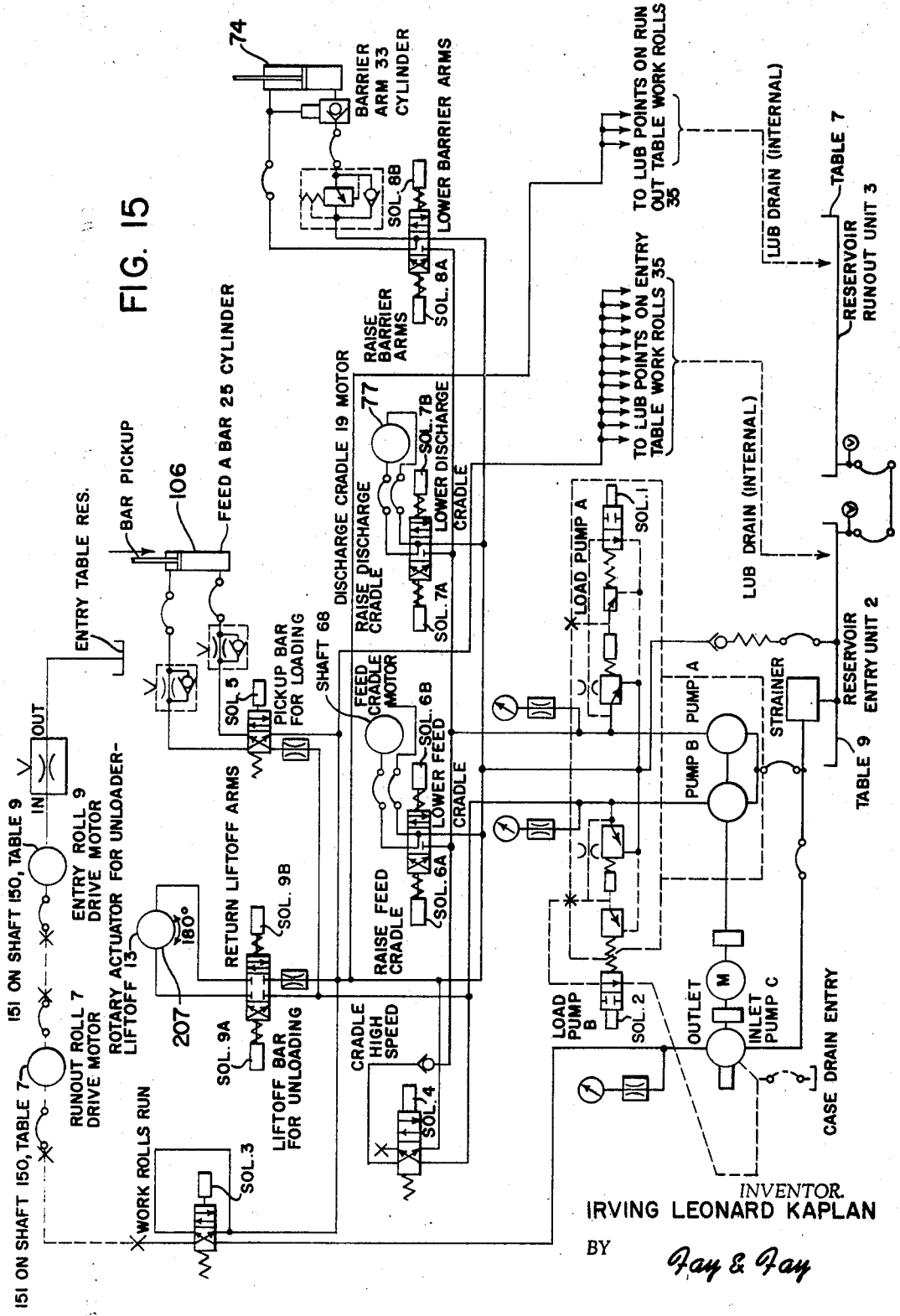

Oct. 28, 1969     I. L. KAPLAN     3,474,914
BAR HANDLING DEVICE
Filed July 26, 1965     12 Sheets-Sheet 11
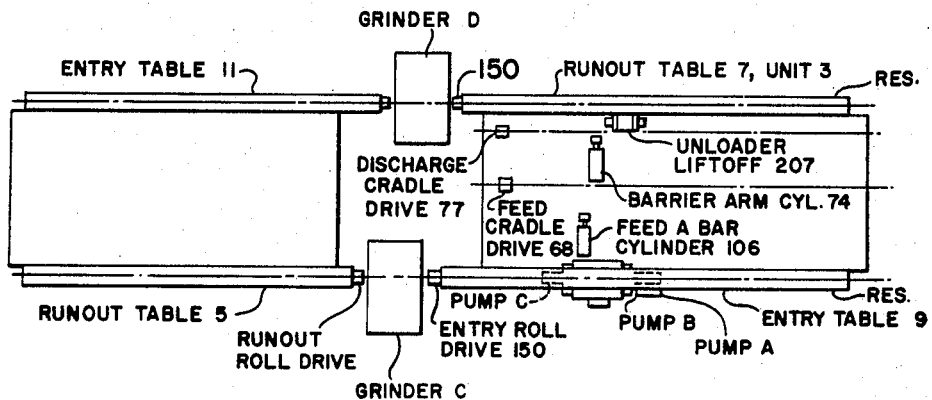
FIG. 15A
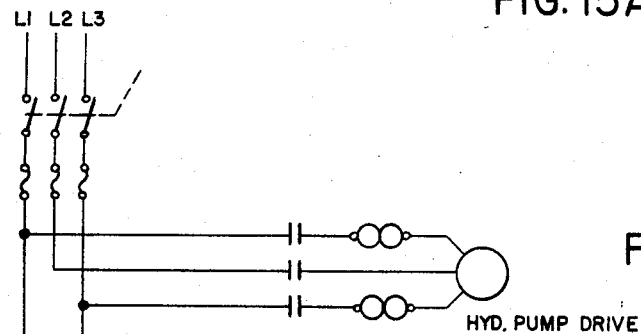
FIG. 16
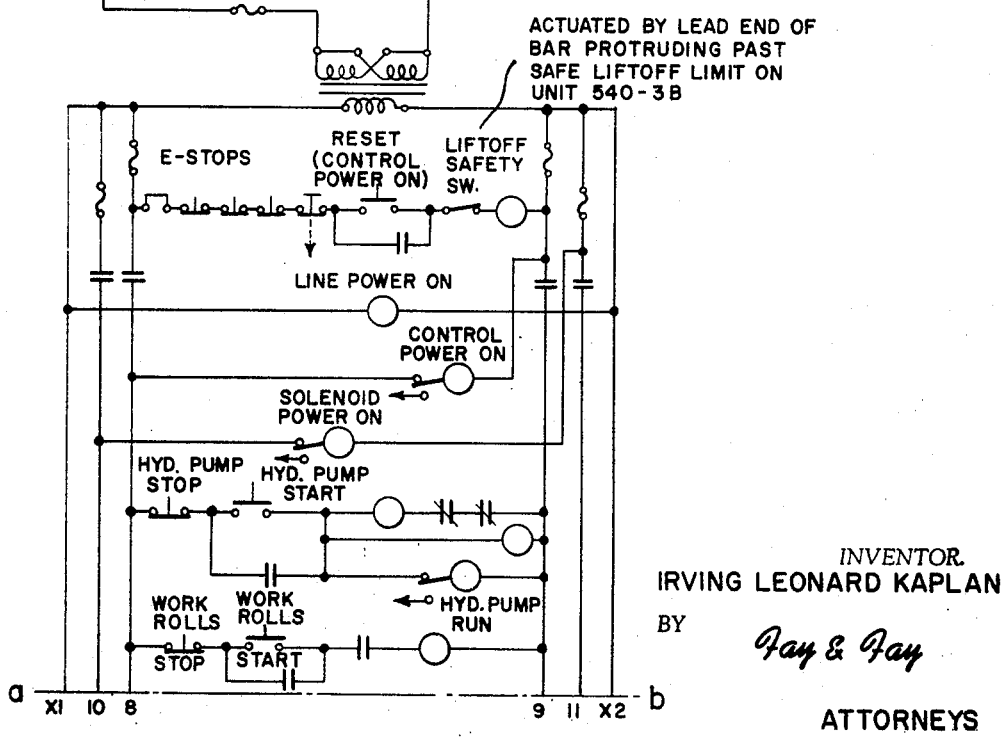
INVENTOR.
IRVING LEONARD KAPLAN
BY
Fay & Fay
ATTORNEYS

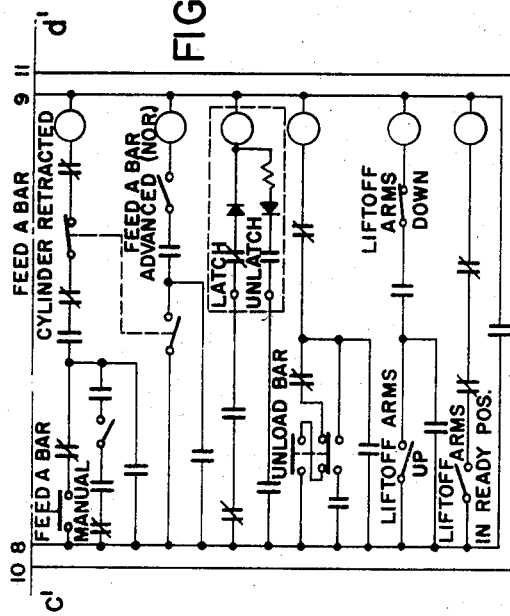
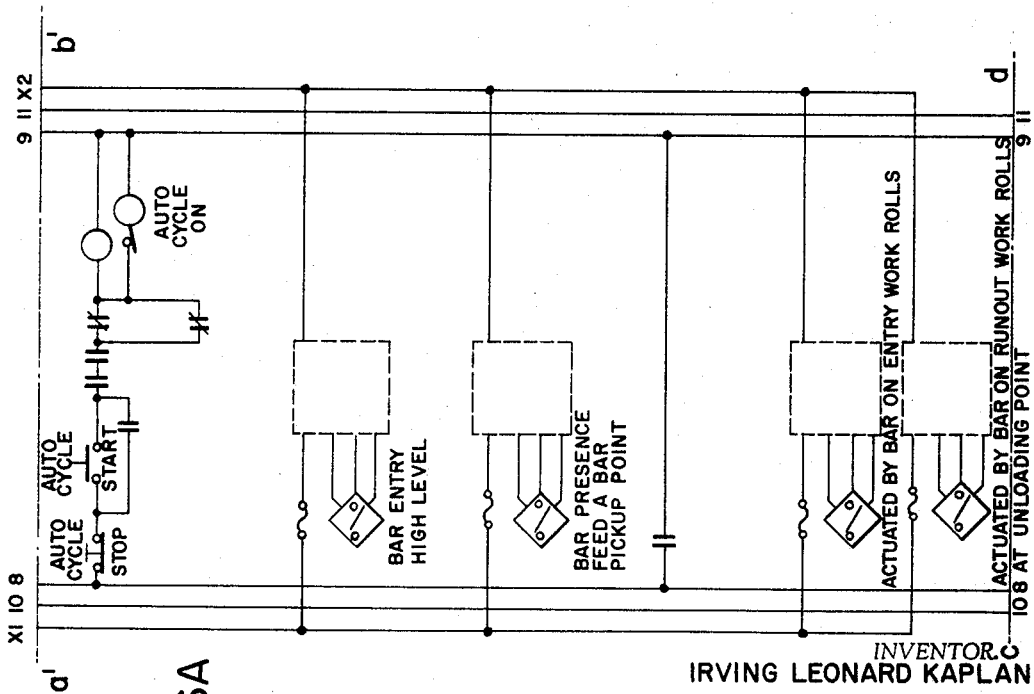
Oct. 28, 1969     I. L. KAPLAN     3,474,914
BAR HANDLING DEVICE
Filed July 26, 1965     12 Sheets-Sheet 12
FIG.16B
FIG.16A
INVENTOR.
IRVING LEONARD KAPLAN
BY Fay & Fay
ATTORNEYS United States Patent Office 3,474,914
Patented Oct. 28, 1969

3,474,914
BAR HANDLING DEVICE
Irving Leonard Kaplan, Cleveland Heights, Ohio, assignor to Carl Krasny & Associates, Inc., Cleveland, Ohio, a corporation of Ohio
Filed July 26, 1965, Ser. No. 474,606
Int. Cl. B25j 3/00; B65h 51/26
U.S. Cl. 214—1                    22 Claims

ABSTRACT OF THE DISCLOSURE

A bar or tube handling device for automatic or manual operation adapted for use for fast and gentle handling of the workpiece in centerless grinding, belt grinding, belt polishing or nondestructive testing where predetermined rates of rotary and longitudinal movement are utilized to produce a desired helical path of a point on the surface of the workpiece. The device includes a base frame means, a bridge means, a magazine and powered rollers adjacent the magazine for longitudinally advancing the tube or bars to a work station. A feed cradle to store a plurality of bars to be fed to the magazine is provided which includes means to feed the bars laterally between the bar storage area and the magazine. The magazine includes a structure to align the bars in tangent parallel relation to each other. The means to align the bars includes upper guide plates mounted on the bridge means and lower guide plates mounted on the base frame means. The upper guide means may be selectively moved in a vertical direction to accommodate bars of different diameter in the magazine. A device to pick up the bars one at a time in sequence is provided in association with a guide cam means to determine the lateral path of travel of the bars when they are in engagement with the means to pick up bars. The cam means are moveably mounted opposite the magazine for adjustment in response to the adjustment of the magazine guide plates to accommodate bars of different diameter. The cam means directs the bars one at a time to a means to lower the bars onto the powered rollers gently without dropping them. A barrier arm is provided adjacent the feed cradle such that when two of the handling devices are used in tandem for multipass operation, bar receiving powered rollers on a runout table on the opposite side of the machine from the entry table receive the bars, such that a bar pick up means adjacent thereto can place the bars in a discharge cradle which is defined and separated from the feed cradle by the barrier arm. The barrier arm is selectively moveable to permit passage of the bars from the discharge cradle directly to the feed cradle for multipass operations or to keep the discharged bars segregated from the bars in the feed cradle for removal from the device. The bar lift-off device is provided with a folding arm which permits its return to a position of readiness for lifting a bar without interference with said bar as it moves into position on the runout table and without the arm being swung 360° about its support.

This invention concerns an automatic bar and tube handling device particularly adapted for use for fast and gentle bar handling in centerless grinding, belt grinding, belt polishing, eddy current testing, ultrasonic testing, or anywhere it is desirable to support bars and long slender tubes with some combination of rotary and longitudinal movement.

The device is designed to provide gentle handling of the bars to prevent finish marring. The bar handler constructed according to the principles of this invention is capable of semiautomatically unscrambling five-ton bundles of bars, orienting the material into a single layer, and gently freeing one bar at a time and longitudinally feeding and rotating the bar at a desired rate into a bar treating machine. The device may be used with production or testing machines for handling bar input and output in that it can accumulate the finished work in an adjustable depth cradle, keep it segregated from rough work, and recycle the finished work, if desired.

When more than one device is used in tandem, an operator is able to accomplish multipass operations independently of crane service since no operator attention is needed in transferring parts from one operation to the next. This can be done since the equipment can be set up to transfer from the accumulating cradle of one device to the feed cradle of an adjacent device.

Commercial cold drawn bars and turned bars, for example, require from three to six passes through a centerless grinder to achieve standard size and finish requirements. Automatic gauging, dressing, and compensating equipment can be utilized in combination with the bar handling machine to feed a five-ton bundle of bars into a centerless grinder and then return each bar for a predetermined number of passes. The mechanism can be easily adjusted for feed rate, height of feed of the grinder, and size of bars.

In setting up for multipass operations in centerless grinding operations, for instance, two of the bar handling units can be utilized. One bar handling unit is at the discharge end of two grinders positioned back to back to eliminate crane handling between passes. The novel bar handling device of the invention consists of a gentle handling discharge cradle to receive the bars from the grinders, feed cradle arms to receive either the semi-finished bars from the discharge cradle or the rough bars from a crane and a bar magazine which unscrambles and orients a bundle of bars and then feeds one bar at a time to a series of pivoted loading arms for transfer of the bars to driving rolls on an entry table which feed and rotate the bars at a controlled rate through the grinding machine. With the centerless grinding machines completely automated through the use of the novel feed mechanism of the invention, one operator can run up to four centerless grinding machines.

The capacity of the novel device of the invention in one form has been such that it will gently handle five-ton bundles of bars of diameters from one half to two and one half inches and lengths from six to twenty-five feet.

It is an object of the invention to provide an automatic bar handler which can be used to unscramble a bundle of bars, orient the material, and then gently feed one bar at a time longitudinally while producing a desired rotation on the bar.

It is another object of the invention to provide a bar handling device which is capable of use for feeding bars in and out of production or testing equipment with a combination of controlled rotary and longitudinal movement with no dropping or other moves which will mar the bars.

It is a further object of the invention to provide a bar handling device which, when used in combinations, permits multipass operations without the necessity of crane handling of the work pieces during their intermediate stages of completion.

It is a more specific object of the invention to provide a device for gently unscrambling, orienting, longitudinally feeding, and rotating bars automatically through the use of the adjustable centralized controls.

Other and more specific objects of the invention will be apparent from the detailed description to follow.

Broadly, the invention contemplates one or more identical bar handling machines for use in combination with production or testing equipment wherein longitudinal feeding and controlled rate of rotation are required without marring of the bars. For ease of description, a single embodiment wherein two of the automated bar handling devices are utilized for automatic multipass operation on the two centerless grinders is illustrated.

In the drawings:

FIG. 4 is a fragmentary detailed plan view of the control and adjustment arrangement of the bar handler of FIG. 2.

FIG. 5 is a detailed showing of the feed and rotation rate indicator of the bar handling device of FIG. 2.

FIG. 11 is a detailed fragmentary plan view of the portion of the mechanism shown in FIG. 10.

FIG. 12 is a detailed cross-sectional schematic elevational view taken along the line 12—12 of FIG. 11.

FIG. 13 is a fragmentary cross-sectional elevational view taken along the line 13—13 of FIG. 12.

FIG. 15 is a schematic control diagram of the FIG. 1 arrangement.

FIG. 15(a) is a schematic arrangement of the pumps and actuators of the FIG. 1 arrangement.

FIG. 16 is a schematic control diagram of the FIG. 1 arrangement.

FIG. 16(a) is a continuation of the schematic control diagram of FIG. 16.

FIG. 16(b) is a continuation of the schematic control diagram of FIG. 16(a).

Figure 1:
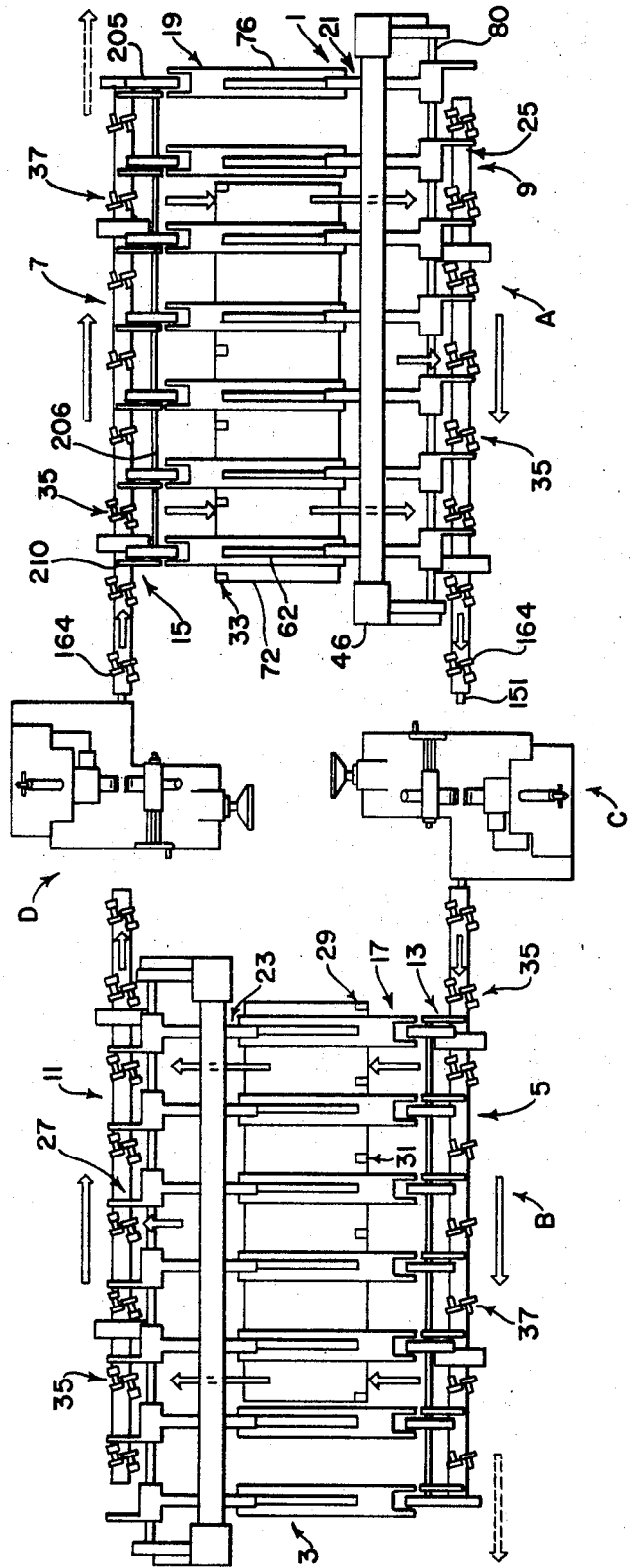
FIG. 1 illustrates a schematic plan view of two of the automatic bar handlers arranged for use with two centerless grinders for the production of cold drawn bars or turned bars for multiple passes through the centerless grinders to achieve commercial size and finish requirements.

In FIG. 1 a bar handling device, generally designated A, and a bar handling device, generally designated B, are positioned in tandem on opposite sides of adjacent centerlines grinders, generally designated C and D, respectively. Each of the bar handlers A and B have arrows adjacent thereto illustrating the direction of feed, runout, and transfer of the bars through the machines during multipass operations. These units are designed, for example, to handle round bars one half to two inches in diameter and from nine feet to twenty-five feet long, and all the functions of the unit are designed to prevent marring of the finished or partially finished work pieces. The units are designed to be capable of handling, feeding, transferring, and discharging bars in one, two, four, or more multipass operations. These units are hydraulic in their power and controls, and the hydraulic controls provide instantaneous changeover from one longitudinal feed and rotational rate to another in accordance with the feed rate of grinders C and D.

The two bar handling units A and B each have on one side thereof a feed cradle generally designated by the numeral 1 in unit A and the numeral 3 in unit B. Runout tables, generally designated by the numerals 5 and 7, respectively are provided at the exit side of each of the two centerless grinding machines C and D. The bars are fed through each of the machines C and D from entry tables, generally designated by the numerals 9 and 11 associated with feed cradles 1 and 3, respectively. After they are passed through the machines C and D from the entry tables 9 and 11 onto the runout tables 5 and 7, the bars are picked up by unloaders 13 and 15, respectively, which operate to move the bars to associated discharge cradles, generally designated by the numerals 17 and 19, respectively, in a manner to be explained in detail hereinafter. From the discharge cradles 17 and 19 the bars are either unloaded or transferrd to the feed cradles 1 and 3. From feed cradles 1 and 3, the bars are moved into bar magazines generally designated by the numerals 21 and 23, respectively, for orientation and transfer one at a time to entry tabels 9 and 11. Bar loaders 25 and 27 move the bars from the magazines to the associated entry table.

In performing a two-pass grinding operation on a bundle of unground bars with the layout of FIG. 1, the bars would be placed in the lowered hydraulic feed cradle 1 by conventional means such as an overhead crane. Each of the centerless grinders C and D would be set for the desired feed rate in a conventional manner. The bar magazine 21 would be fed from the feed cradle 1 such that individual bars are presented to the bar loader 25 which passes the bars to powered rolls 35 on the entry table 9. Rolls 35 of unit A are set, in a manner to be described, for a longitudinal feed rate and rotation of the bar corresponding to the feed rate of centerless grinder C.

Upon demand, as the tail end of one bar clears the entry table 9, a second single bar is lifted by the hydraulic loader 25 from a pick-off position at the lower end of the bar magazine 21 and is lowered hydraulically onto the rolls 35 on the entry table 9 in order to insure continuous uniform loading of the grinding machine and its components.

The ground bar leaving the long bar attachment of the grinder C feeds onto runout table 5 of unit B which is equipped with power rolls 35 and idler support rolls 37. A signal energizes a hydraulic unloading cycle after the ground bar has cleared the long bar attachment and the hydraulically operated unloader 13 transfers the bar to the discharge cradle 17 and over the feed cradle 3 into the bar magazine 27. For this purpose the bottom rail of the discharge cradle 17 and bottom rail of the feed cradle 3 are positioned to provide an uninterrupted straight line gravity transfer rail from the discharge point at the top of the unloader 13 to the bar magazine 23. At the same time the operator positions these cradle rails, a pivoted barrier arm 31 which can form a division between the discharge cradle 17 and the feed cradle 3 is lowered out of the way so that the bars can be transferred straight through to the bar loader 27 for the entry table 11 for passage through machine D. After passage through machine D, the bar proceeds to runout table 7 where unloader and elevator 15 places the bar in discharge cradle 19.

The finished bars, having had a pass through each of the machines C and D remain in the discharge cradle 19 and are separated from feed cradle 1 and the unworked bars therein by a pivoted barrier arm 33 such that a crane operator can remove the finished bars from the discharge cradle 19 and they remain segregated from the unground bars in feed cradle 1.

From the description, it will be obvious that with the smoothness of the hydraulic control system the entire ground bundle can be transferred to the feed cradle 1 for further passes by movement of the pivoted barrier arms 33 out of the way so that the bars could pass into the magazine 21 for further passes. It will be obvious from the description to follow that any number of passes required by the product can be accomplished by various combinations of the modular units described in connection with the two-pass operation.

Figure 2:
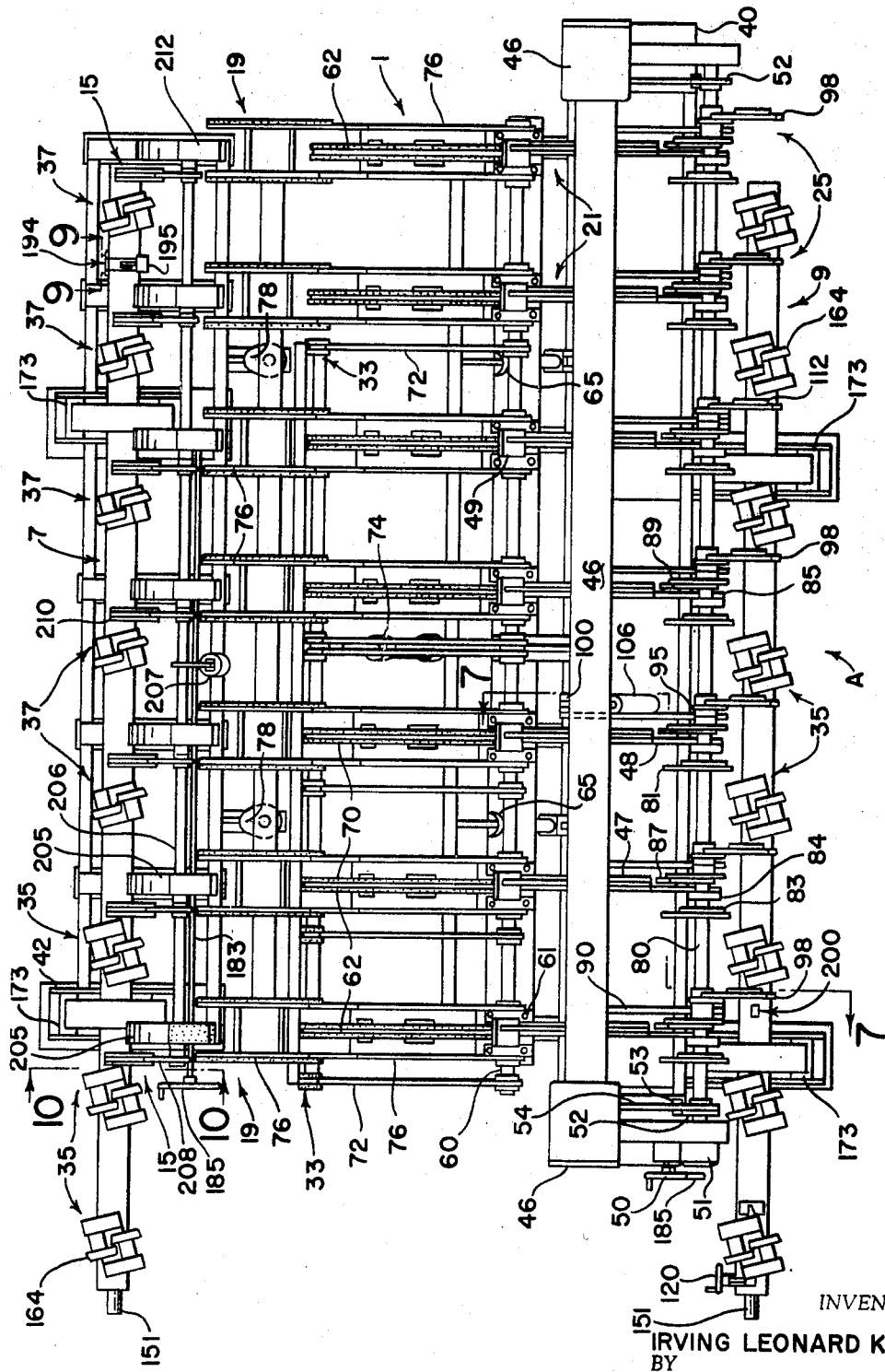
FIG. 2 is a detailed plan view of one of the bar handlers of FIG. 1.
Figure 3:
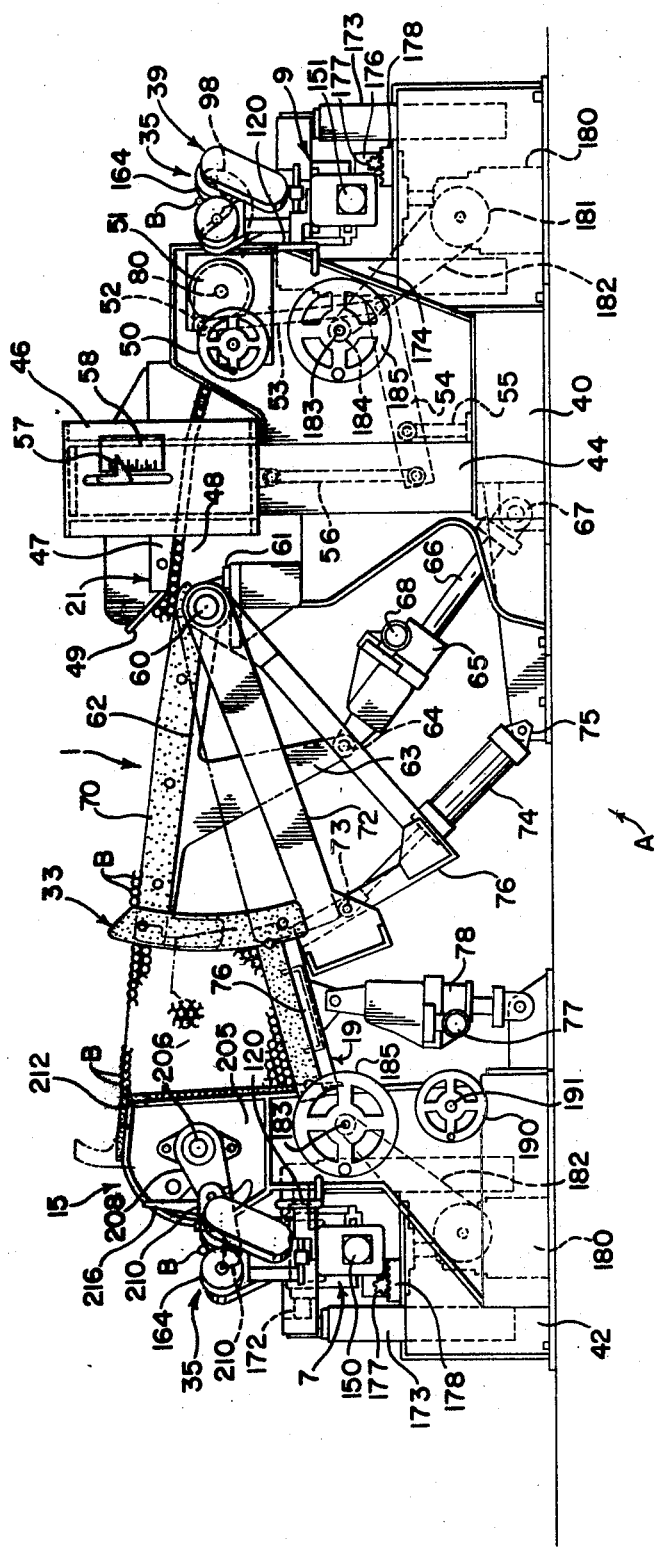
FIG. 3 is a left end elevational view of the device of FIG. 2.

As shown in FIG. 2, a machine base portion 40 supports the magazine and entry table side of the machine and a base portion 42 supports the runout table and discharge cradle side of the machine. Upstanding support columns 44 rigidly attached to the base portion 40, and made a part thereof, have slidably mounted thereon a U-shaped bridge structure 46 for relative movement up and down the columns 44 to adjust the magazine 21 so that the top plate 47 and the bottom plate 48 are properly spaced for the desired bar diameter. The bars are oriented and passed one at a time between the plates 47 and 48 after being funneled in from a bundle by angled plate 49 which converges with the rail of the feed cradle and is slightly spaced therefrom.

The adjustment of the height of the bridge structure 46 is accomplished by turning a hand wheel 50, which through a gear speed reducer 51, turns a bell crank 52 which in turn moves a link 53 to pivot a horizontal link 54 about a fulcrum member 55 to achieve vertical motion in a link 56 attached to the bridge structure 46. The speed reducer 51 is commercially available as a "Winsmith" double reduction worm gear speed reducer, "Series CVD, Unit No. 6." A pointer 57 and scale 58 are calibrated to indicate the bar diameter spacing thus accomplished.

A shaft 60 is suitably journalled on the frame portion 40 and extends substantially the length of the machine, supported by bearing blocks 61. The feed cradle 1, the support arms for the barrier 33, and the discharge cradle support arms all pivot about the shaft 60.

The feed cradle assembly 1 comprises an arm 62 pivotally mounted on the shaft 60. Arm 62 has a downwardly extending crank arm 63 pivotally connected at a point 64 to a worm gear assembly 65. The worm gear assembly 65 moves along a shaft 66 which is pivotally connected to the base 40 as at 67. A shaft 68 is driven by a hydraulic orbit motor to move the worm gear assembly 65 along the shaft 66 and thereby raise and lower the arm 62 and the rails 70 thereon to the desired position for feed.

A gentle handling action is accomplished by the use of the material known as Masonite Benolex "70" for the bar engaging surfaces of the rail 62. The plates 70 are attached to the arm 62 in any suitable manner such as bolting. Other wear surfaces are provided of the same material.

The barrier arm 33 is mounted on a pivoted arm 72 pivotally fastened to the shaft 60 and connected by means of a pivot point 73 to a hydraulic cylinder 74 which, in turn, is pivotally connected to the base 40 of the machine by a shaft or pin 75 in a suitable manner. In this manner, upon actuation of the cylinder 74, the barrier arm may be raised or lowered. The hydraulic cylinder 74 is double acting and supplies the power in either direction for these operations.

The discharge cradle assembly generally designated by the numeral 19 has a worm gear unit 78 pivotally connected to arm 76 having suitable wear plates similar to plate 70 of the feed cradle 1. The arm 76 is Z-shaped and is pivoted about the shaft 60 upon actuation of the worm gear 78 by means of rotation of shaft 77. The shaft 77 is driven by a hydraulic orbit motor in the same manner as shaft 68 of the feed assembly.

The worm gear units 65 and 75 are commercially available as "Duff-Norten No. 1805" worm gear jack standard units with upright screw and flexible boot. The hydraulic orbit motors to drive the shafts 68 and 77 are commercially available as "Char-Lynn" hydraulic orbit motor "No. 2CF."

FIG. 4 illustrates in detail the control and drive elements of the bar loader 25 and power rolls 35 for the entry table 9 and the adjustments therefor. The hand wheel 50 through the dual speed reducer 51 in turning the crank 52 to raise and lower the bridge also turns the shaft 80 to which the bridge crank 52 is keyed. This also sets the stop cam 81 at a predetermined location so that its upper contour smooths out the curve or path of travel of the bars as seen for example in FIG. 7.

When the shaft 80 turns with the movement of the hand wheel 50 through the speed reducer 51, the stop cam 81, which is bolted by means of bolts 82 to a collar 83 keyed to the shaft 80, rotates with the shaft 80. The element 81 of the stop cam determines the path of the bar, as will be seen in connection with FIG. 7, and its adjustment corresponds to the adjustment of the height of the bridge 46 by means of the interconnection through shaft 80. This insures that the proper pickoff of the bar is provided for a given bar diameter. A flanged collar 84 which is journalled for the shaft 80 is attached to the portion 85 of frame 48 by means of bolts 86 such that the shaft 80 is rotationally supported by the plate 85 which is integrally connected with the machine base 40, as a part thereof. A bar pickoff member 87 is bolted by means of bolts 88 to a plate 89 which is bushed for rotation independent of the shaft 80. Thus, the pickoff element 87 rotates independent of the shaft 80 in response to a rocking by an arm 90 pivotally attached by pivot pin 91 to the plate 89.

In like manner a lower pivot arm 92 is attached by means of a pivot pin 94 to a plate 95 which acts as a crank. The plate 95 is mounted for rotation about the shaft 80 and has bolted thereto, by means of bolts 96, a bar lowering arm 98. The pivoted arms 90 and 92 which, through the described mechanism, move the pickoff plate 87 and the bar lowering arm 98 about the shaft 80, are attached to a pair of arms 99 and 100 which are keyed to rotate with a shaft 102. The shaft 102 is journalled for rotation through the base structure 40. The shaft 102 is a rotatable shaft with which the arms 99 and 100 pivot. At the end of the arm 99, the shaft 90 for driving the pickoff arm 87 through plate 89 is pivotally attached by means of a pivot pin 103. In like manner, the rod 92 is attached by means of a pivot pin 104 to the end of the arm 100 so that the lowering arm 98 moves through plate 95 when the shaft 102 moves, rocking the arms 99 and 100.

Figure 7:
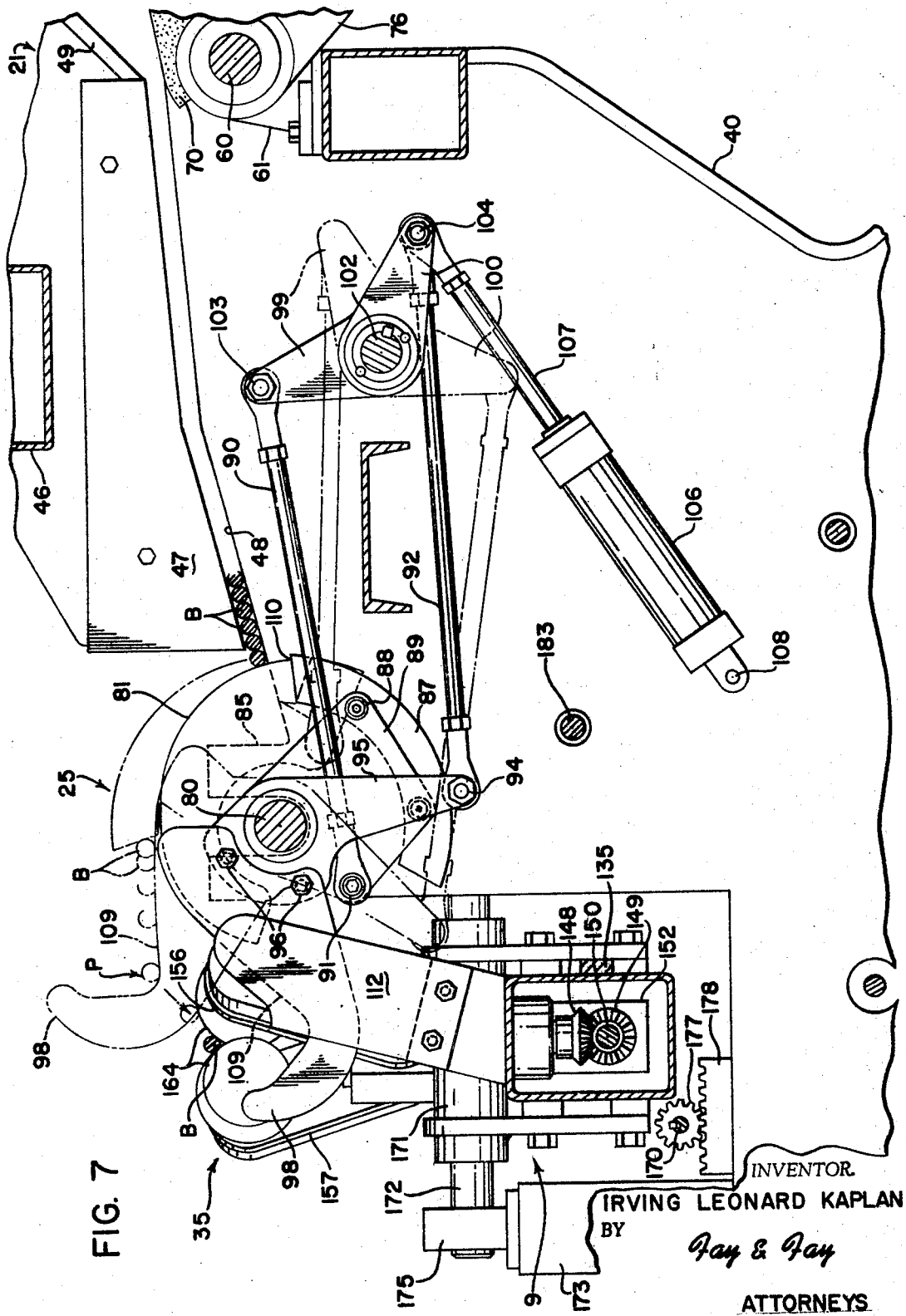
FIG. 7 is a fragmentary cross-sectional elevation view of the device along the line 7—7 of FIG. 2 and of FIG. 4.

From the linkage, as viewed in FIG. 7, we see then that the pickup member 87 moves in a counterclockwise direction when the pivot point 103 is moved clockwise around the shaft 102 and the lowering arm 98 moves in a clockwise direction as viewed in FIG. 7 when the rod 92 moves in a clockwise direction at its pivot point 104. This action of rocking the shaft 102 is created by a hydraulic cylinder 106 which is a double action type similar to cylinder 74 which moves a shaft 107 to rock the arms 99 and 100 and the shaft 102 to which they are keyed upon activation of the hydraulic cylinder 106. The hydraulic cylinder shaft 107 is pivotally connected to the arm 100 for this purpose on the pin 104 and is pivotally mounted to the base of the machine 40 by appropriate pivot pin 108. The shaft 102 has cams which activate mechanical limit switches to operate cylinder 106.

As illustrated in FIG. 7 then, upon actuation of the cylinder 106 to retract the shaft 107, the arms 99 and 100 are rocked to the position shown in phantom and the rod 92 translates this motion into a clockwise rotation of the plate 95 about the shaft 80, and the contoured lowering arm 98 is therefore moved clockwise to its phantom position. At the same time, the arm 99 pulls the rod 90 to move the plate 89, and the pickoff member 87 attached thereto, in a counterclockwise motion until the position shown in phantom is reached. The phantom position of the members 87 and 98 in FIG. 7 having been reached, the bar is forced just past its center and begins to roll by gravity down the work-engaging surface of the lowering arm 98. As the hydraulic cylinder 106 is reversed in its action and the arms 100 and 99 are rotated with the shaft 102 back to the position shown in full from the phantom position, counterclockwise of the shaft 102, the rod 92 moves the plate 95 counterclockwise from the phantom position to the position shown in full.

At the same time, the rod 90 moves the plate 89 clockwise such that the pickoff member 87 moves in a clockwise direction, holding the next bar in the magazine until the point 110 of the pickoff arm 87 clears the bar. In response to the movement of rod 90, at the same time, the arm 98 is moving in a counter-clockwise direction, and the bar is gently rolling down the work-engaging surface 109 of the bar 98 until the bar reaches the position P shown in phantom and is cradled right between the powered rollers of the unit 35 as shown in full in FIG. 7.

The geometry of this series of surfaces is such that the bar is at no time moved rapidly enough that it drops or comes into forceful contact with a top surface. This eliminates a marring of the bars and is particularly important on multipass operations where partially-finished work could be marred. It will be noted that the stop cam 81 determines the path of travel of the bar when it is picked off by member 87 from the magazine between the plates 47 and 48. The stop cam 81 is adjustable with vertical movement of the bridge 46 such that its distance from the front edge of the plate 47 is exactly right for the point 110 to pick off one bar and move tangentially with the second bar in its counterclockwise or upward movement. This movement or adjustment is accomplished by the single hand wheel 50 since both the stop cam 81 and the plate 47 move directly in correspondence to the rotation of shaft 80 by the hand wheel 50. For this reason, the single hand wheel 50 provides a single adjustment for the various diameter bars and insures that the proper spacing between the plate 47 and the plate 48 and the plate 47 and the stop cam 81 is provided at all times. For this purpose, it will be seen that stop cam 81 has a surface which is an arc, not exactly concentric with the shaft 80; and the pickoff member 87 has an overlapping arc, not concentric with the shaft 80, about which it is rotated.

For modifying the path of the bar during this travel, a suitable guide member 112 can be mounted with any appropriate contour to aid the positioning of the bar as it is moved down by the lowering arm 98 so that it is placed on the drive rollers at exactly the proper point and will not move out of the drive rollers. It is contemplated that a further guide 112 extending outside of the axis of a driven bar could be provided such that larger diameter bars would be moved beyond the center line of their longitudinal movement by the powered rollers 35 and then be cammed back in so that as it settles on the rollers, it will be placed exactly between them. These modifications in the path of the bar when being gently brought down by the lowering arm are possible by means of members equivalent to the to the member 112 which have contours to engage the bar as it is lowered by the lowering arm 98.

Figure 8:
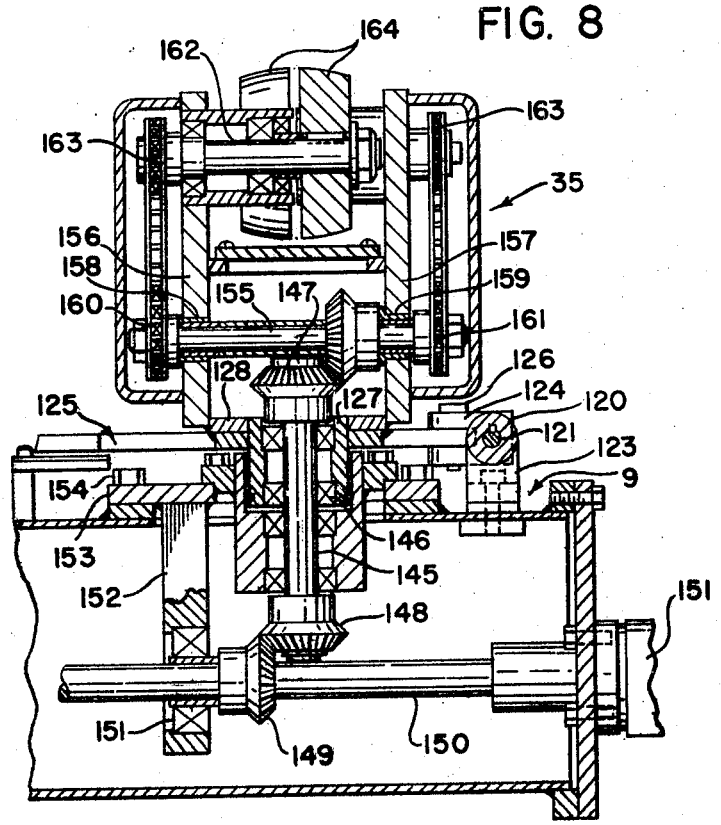
FIG. 8 is a cross-sectional elevational view taken along the line 8—8 of FIG. 4.

The described embodiment of the machine used in combination with centerless grinders is used with control as illustrated in FIGS. 4 and 5 for determining the feed rate. A hand wheel 120 is mounted on the entry table 9 for rotation of a shaft 121 to which it is keyed. The shaft 121 has a threaded portion 122 and is mounted for rotation on a bracket 123 securely affixed to the top surface of the entry table 9. A nut 124 is threadedly engaged with the portion 122 of the shaft for movement longitudinally upon rotation of the hand wheel 120. The nut 124 has an indicator control arm and link 125 pivotally attached thereto by a pin 126. The indicator link 125 is fixed on a power roller head 35 for rotation therewith by welding or other suitable means such that the indicator link rotates and scans a scale plate (FIG. 5). The link 125 is fixed to a sleeve 127 rigidly mounted in a housing bottom 128 for rotation with the power roller head 35. In this manner the indicating link 125 moves with the head 35, as will be clearly seen from the structure illustrated in FIG. 8, for example. Accordingly, in response to the rotation of the hand wheel 120, the skew angle of the rollers relative to the direction of travel is determined.

The indicator link 125 has an arm 130 extending at approximately 90° from the arm connected by means of pivot pin 126 to the nut 124. The arm 130 has a pivot pin 131 which pivotally connects it with a link 132 between a projection 133 rigidly fixed on a longtudinal actuation rod 135. A pivot pin 134 connects link 132 to the projection 133, and at the other end of the link 132 is the pivoted connection through pin 131 with the arm 130 of the rotatable indicator link 125. Because of this connection, movement of the hand wheel 120 creates movement in the longitudinal actuator 135 which in turn creates a corresponding movement of the projection 133'. The movement of projection 133' creates movement through link 132' and pivot pins 134' and 131' on either end thereof such that an arm portion 140, which corresponds to the arm portion 130 of the link 125, is rotated. Through a rigid connection of the arm 140 to the adjacent power head 35, in the same manner the indicating link 125 is rigidly fixed to the power head 35, responsive rotation of that head, which exactly corresponds to the movement of power roller head in association with the indicating link 125, is accomplished. In a like manner, each of the power roller heads 35 is attached to a projection corresponding to projection 133 through a link corresponding to the link 132 by arms corresponding to arm 140 so that all of the power heads are moved in unison to produce the same amount of skewing by their respective sleeves 127 upon turning of the hand wheel 120.

The main vertical power shaft 145 for each head is concentric with, and passes directly through, the sleeves 127 and through bearings 146 mounted therein. This vertical power shaft has bevel gears 147 and 148 on its upper and lower ends, respectively, such that the lower bevel gear 148 engages a bevel gear 149 mounted on a central drive shaft 150. The drive shaft 150 is powered by "Char-Lynn" hydraulic orbit motor 151. Each of the bevel gears is keyed to its respective shaft, and the shaft 150 is journalled in bearings 151 held by brackets 152 suspended to isolate it from environmental contaminants within the entry table 9 from an angular member 153 welded thereto and bolted down by bolt 154. It is obvious that other conventional arrangements for supporting the drive shaft 150 could be utilized.

The upper bevel gear 147 on the vertical head shaft 145 drives a horizontal shaft 155 mounted for rotation between two walls 156 and 157 of the head 35 in bushings 158 and 159. The shaft 155 has sprockets 160 and 161 on each of its ends outward of the walls 156 and 157. Above the sprockets 160 and 161, outwardly of the shaft 155, are rotatable shafts 162. Each shaft 162 has a sprocket 163 mounted on the one end thereof and a soft roller 164 on the end opposite the sprocket. Suitable chains drivingly connect each pair of sprockets. The rollers 164 preferably have a contoured configuration such that they have a slightly larger diameter on the side adjacent the other roller. The diameters of these rollers are such that they overlap one another just adjacent to each other. The rollers 164 are preferably made of polyurethane to insure that the bars driven thereby are not marred or scratched.

The indicator link 125 is positioned over a scale plate which has curves representing the bar diameter in inches plotted against the number of degrees which the regulating wheel of the associated grinder is skewed. Thus, it is merely necessary to turn the hand wheel 120 until the indicator arm is over the proper intersection of curves for the degree setting on the regulating wheel and the given bar diameter and the corresponding action through the linkage, and the longitudinal actuating bar 135 sets all of the power heads 35 to proper skewed angle corresponding to that of the regulating wheel on the centerless grinder. In this way, the feed and rotational rate of the entry table 9 corresponds to that of the grinding machine. This simple control mechanism permits a single setting.

When the centerless grinder, however, is set up for automatic dressing and compensating of wheel wear, it is possible by means of a shaft 170 which connects to the centerless grinding table compensator drive, to provide for a further movement of the entry table 9 laterally to maintain a proper alignment of the longitudinal bar path with the path of the centerless grinder. The entry table 9 is suspended by means of collars 171 on ways 172 which are fixed supporting shafts extending between upstanding support posts 173 and 174. Suitable brackets 175 support the shaft 172 rigidly with respect to posts 173 and 174. In response to either a hand wheel turning or a coupling of the shaft 170 with the grinder compensating table drive shaft, the shaft 170, which is rotatably journalled and supported in a block 176 rigidly affixed to the entry table 9, drives a pinion 177 along a rack 178. A hand crank, not shown, or a wrench can be applied to the end of the shaft 170 for this purpose to insure that the path of bar travel on the entry table 9 is in exact axial alignment with the path of bar travel through the centerless grinder. The rack 178 is rigidly attached to the table suspension system, which includes the upstanding columns 173 and 174 and a bottom plate 179.

The bottom plate 179 and the entire entry table 9 and columns 173 and 174 are such that they may be raised and lowered by a screw jack 180 which is actuated by means of a sprocket 181 drivingly connected by a chain 182 to shaft 183 and sprocket 184 which are rotated by a hand wheel 185. Thus, rotation of the hand wheel 185 raises and lowers the entry table 9 and provides vertical movement of the longitudinal axis of the traveling bars for alignment with the centerless grinder. Moreover, since the entry table 9 is thus suspended independently of the shaft 80 and the associated bar feeding mechanism 25, the height of the rollers can be adjusted to insure that the bar unloading arm 98 releases the bar on the rollers at the proper position.

The run-out table 7 is illustrated in FIGS. 2, 3 and 10 through 13, as is the discharge cradle 19. A table suspension system for the run-out table 7 and a drive system which exactly duplicates the system of entry table 9 with the exception that idler rollers 37 are not driven from the drive shaft and, consequently, need no sprockets or chain drive. The idler rollers 37 are otherwise the same and are linked up to a control rod corresponding to longitudinal actuator rod 135 in the same manner as the power roll heads 35. In addition, it will be noted that there is a power jack arrangement for the run-out table 7 corresponding to the lifting jack 180 and the attendant structure. The run-out table 7 then is the same as the entry table 9 with the exception that it has certain idler roller heads 37 at the run-out end and, in the illustrated embodiment, only three powered roller heads 35. All of the roller heads 35 and 37 and tied together for movement by a hand wheel which corresponds to the wheel 120 of the entry table 9.

The "Char-Lynn" motors driving the drive shaft 150 for the entry table 9 and the corresponding drive shaft for the run-out table 7 are connected in series in the hydraulic circuit, as will be seen from the drawings, so that the rollers rotate at constant speeds relative to each other. A view of FIG. 3 will show the hand wheel arrangement for the run-out table which corresponds to the hand wheel arrangement of entry table 9 for skewing the rollers and for raising the table.

Adjacent the base 42 and journalled therein a hand wheel 190 is provided. The hand wheel 190 and the shaft 191 which it rotates illustrates an alternative provision for moving either the entry table 9 or the run-out table 7 with which it is associated. The shaft 191 can have a crank attached to it with a linkage to the table 7 so that the rotation of the hand wheel 190 and the shaft 191, to move the crank keyed thereon (not shown) and thereby create movement of the entry table 7 on its ways 172. This device then, would be used in place of the shaft 170, pinion 177, and rack 178 for lateral movement of the tables on their ways 172 where desired. The advantage of this system, of course, is that it eliminates backlash which is present between the rack 178 and pinion 177. Accordingly, it provides for more positive movement in the lateral direction of the table 9 with which it is associated when needed. In either event, it will be seen that the entry table suspension and positioning features are made identical with the run-out table features, and for this reason, the complete description of the mechanism in connection with entry table 9 is deemed adequate in that the same mechanism and elements are present for moving entry table 7 both laterally and vertically.

Figure 9:
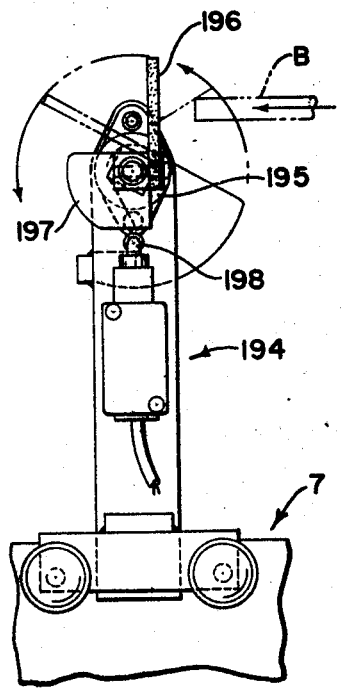
FIG. 9 is a fragmentary elevational view taken along the line 9—9 of FIG. 2.
Figure 14:
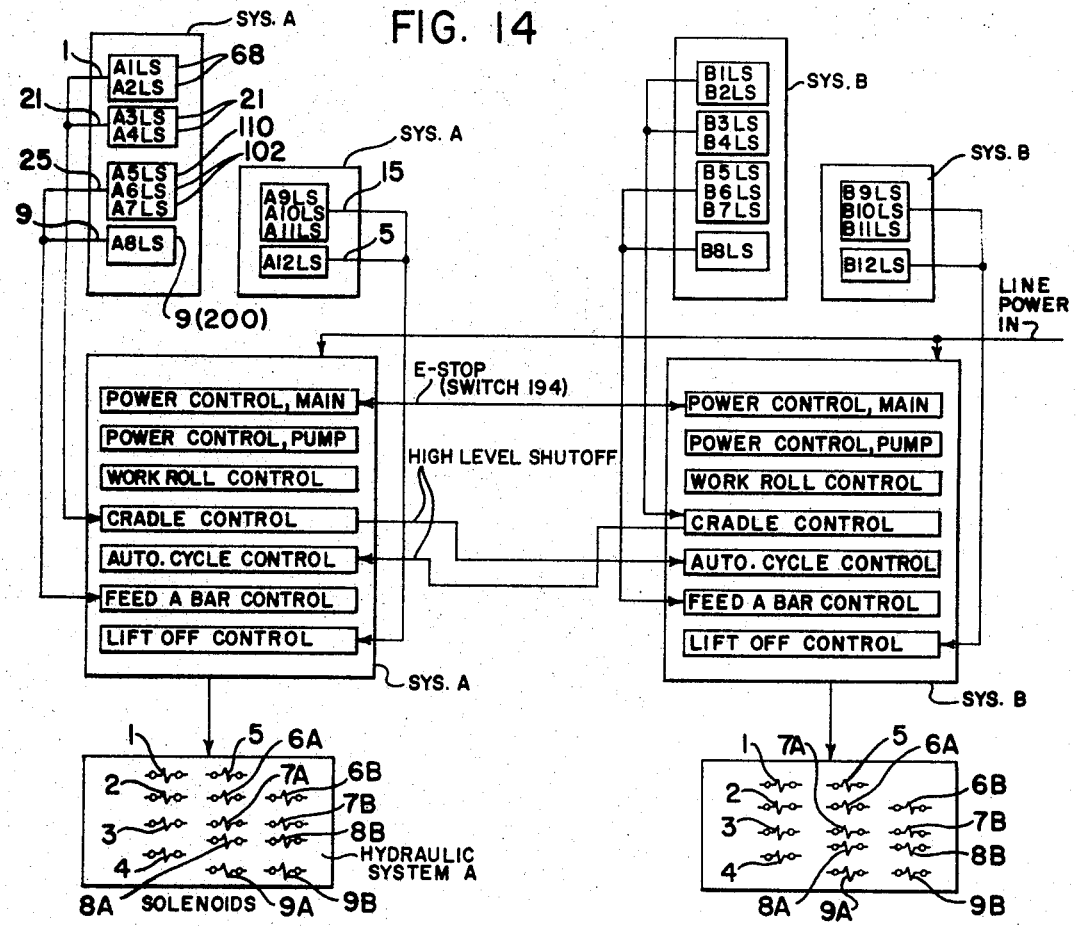
FIG. 14 is a schematic control diagram of the FIG. 1 arrangement.

FIG. 9 shows a safety emergency mechanical type of switch generally designated by numeral 194 which can be mounted on either table 7 or table 9. Switch 194 has a torsion spring housing 195 and an actuator 196. A bar B moving against the actuator 196 rotates it in a counter clockwise direction as shown by the arrows, and a cam 197 which is fixed to rotate with the actuator 196 engages and depresses a limit switch 198 which, as will be seen from the control diagram, FIG. 14, is connected to the main power supply. The purpose of this mechanical device is that if any failure occurred in one of the components of the electrical or the hydraulic system and a bar kept running out table 7, for instance, without being picked off by the elevator or lift-off mechanism 13, then this wholly mechanical switch at the end of the run-out table acts as an emergency stop to cut off all power to all systems until the defect could be detected and remedied by the operator. Thus, it is seen that the switch 194 will normally be mounted at the end of the run-out table 7 and in the path of travel of the bar to insure that it does not travel too far before being lifted off.

Figure 6:
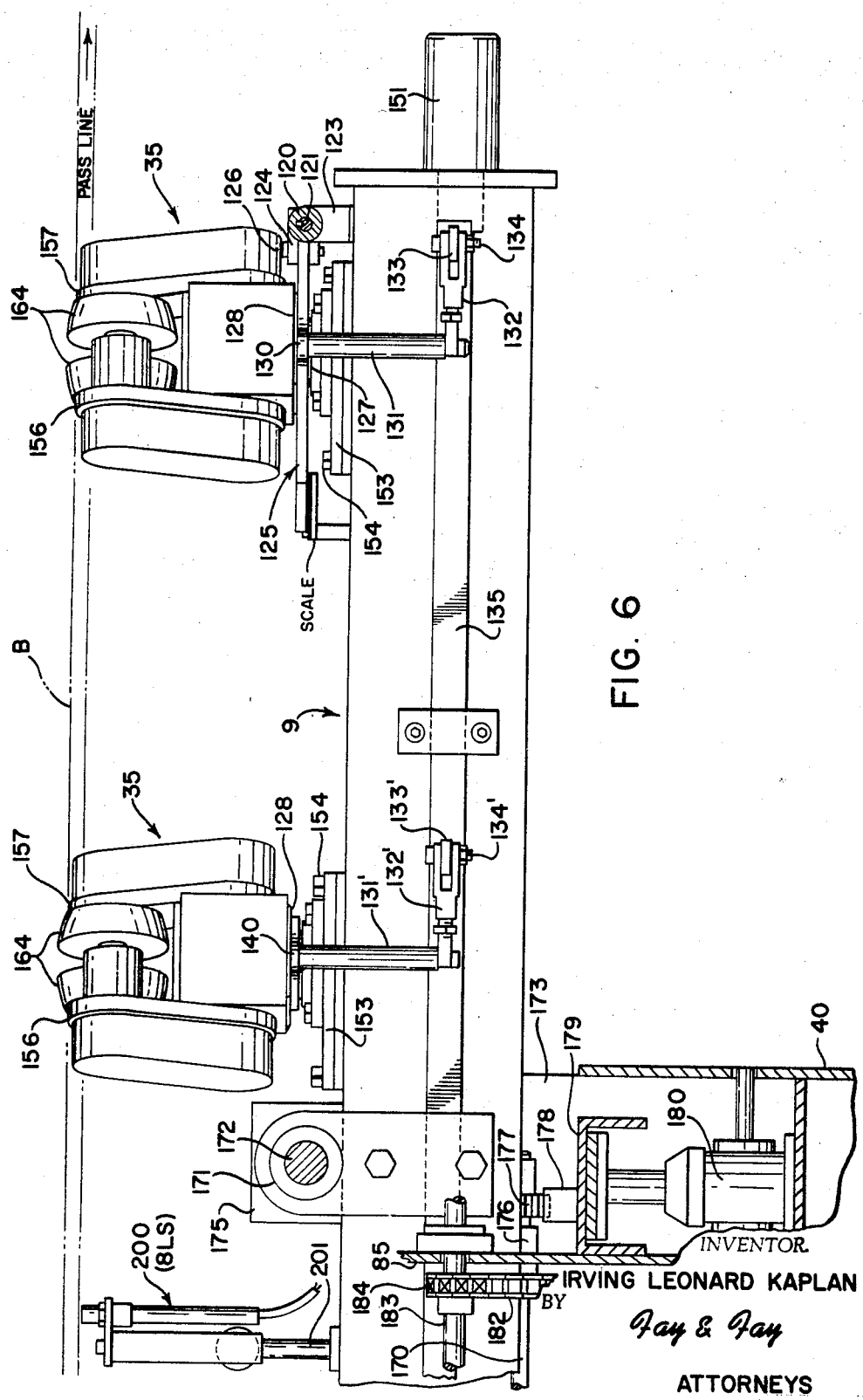
FIG. 6 is a fragmentary elevational view of the drive mechanism of the device of FIG. 2 taken along the line 6—6 of FIG. 4.

In FIG. 6, it will be seen that there is a proximity switch 200, which is a type that is commercially available, mounted on a bracket 201 on the top of entry table 9. The proximity switch 200 is of the known type which sets up a field which senses the presence of the bar interrupting the field. The locations of the various proximity switches and their function will be seen in connection with the schematic circuit diagram in FIG. 14 and is shown in FIG. 6, simply to illustrate one general physical configuration it may have.

Figure 10:
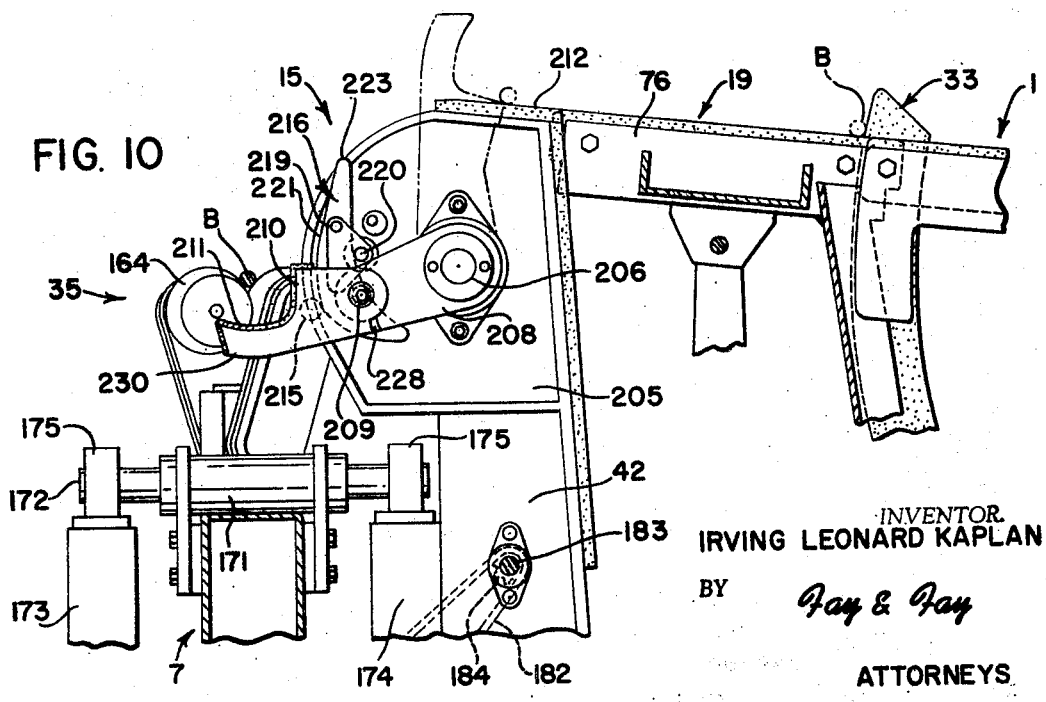
FIG. 10 is a fragmentary cross-sectional elevational view taken along the line 10—10 of FIG. 2.

In FIG. 10, the unloader and elevator 15 of the run-out table 7 is shown in its relationship to the discharge cradle 19 and the barrier arm 33. The machine base frame portion 42 and the table 7 on the run-out side has a top support plate portion 205 which is integrally secured to the frame 42 and a part thereof. A shaft 206 runs through each of the plates 205 and is journalled for rotation therein. The shaft 206 rocks through approximately 180° by means of an actuator 207. This can be any conventional hydraulic actuator and crank arrangement, however, it has been found that a two-way rotary vane type actuator is especially suitable for the purpose. In any event, the hydraulic actuator 207 either through a crank arm or by being keyed to the shaft, if the vane type, creates the 180° rotation in the shaft 206 upon response to the controls of the electrical and hydraulic circuit as shown in the FIGURES 14 and 15.

The shaft 206 has arms 208 attached thereto and keyed for rocking therewith in response to the movement of actuator 207. The arms 208 have pivotally mounted on an end portion thereof opposite the shaft 206 by means of a pivot pin 209, a bar lift-off arm 210. The lift-off arm 210, of course, has the appropriate material to prevent marring of the bars in the form of a wear surface 211 thereon. The plate 205 which acts as a bar guide when passed the bar by the arm 210, in a manner to be seen, has a wear surface 212 thereon of the same "Benolex" material used for the other bar engaging wear surfaces.

Mounted on the pivoted lift-off arm portion 210 is a cam follower 215, and a crescent-shaped cam 216 is mounted by means of bolts 217 and 218 on a triangular plate 219. The bolts 217 and 218 are at two of the apexes of the triangular plate 219 and at the third apex is a pivot pin 220 which pivotally mounts the plate 219, and the cam 216 rigidly mounted thereon by bolts 217 and 218, about the pivot pin 220 in an arcuate direction. The generally boomerang or crescent shape of the cam 216 includes an outer camming surface 221 for engaging the follower 215 of the lift-off arm 210 and inner surface 222. Surfaces 221 and 222 are interconnected by an upper apex of the cam 223. As a bar on table 7 is sensed by a proximity switch similar to switch 200, the hydraulic actuator 207 rocks the shaft 206 in a clockwise direction, and as shown in FIG. 12, the lift-off arm 210 moves from the position M shown in phantom through the position N shown in phantom picking up the bar B from the rollers of table 7 with surface 225 of the lift-off arm 210. Accordingly, the bar B is brought upwardly in a path determined by the follower 215 following the outer surface 221 of the cam 216. As the cam 216, with plate 219 to which it is attached, pivots about point 220, from the position indicated M for the cam 216, through the position indicated N, and beyond, the bar B is brought over the surface 212 and rolled down the surface 225 on the arm 210. The bar is then passed by gravity to surface 212 from where enters the discharge cradle 19 and gently rolls down against the wear surfaces on barrier arm 33, as shown in FIG. 9, for example.

During the upward movement, the follower 215 of the arm 210 following the surface 221 of the cam 216, the arm 210, with respect to the member 208 upon which it pivots is in a generally extended direction against a stop surface of projecting lug 228 which is on the arm 208. Lug 228 in conjunction with the contour of the arm 210, as shown for instance at 229 in FIG. 12, prevents any further downward pivoting of the arm portion 210 relative to the arm 208 upon which it is mounted, beyond the position shown in FIG. 10.

As will be seen from FIG. 12, for example, the arm 210 and its surface 229 permit the arm 210 to pivot approximately 90° about the point 209. Thus, when the cam follower 215 of the arm 210 reaches the apex 223, the particular shape of the cam 216 counter weighs it so that it pivots about point 220, from cam position N to position cam M, and the cam follower 215 starts downward on the surface 222 on the concave back or inside of the cam 216. With the cam follower riding along the surface 222 on the cam 216, the arm portion 210 pivots about the pin 209 to almost a 90° position with respect to arm 208 such that the lower surface 230 of the arm 210 clears the next bar B which is being brought along the run-out table 7.

When the completed cycle of the shaft 206 in its rocking is accomplished, the arm 208 and end portion 210 return to their positions as shown in FIG. 10. Thus, it will be seen that by the complete rocking cycle of the shaft 206, the arm 208 and its lift-off portion 210 pivoted at 209 thereon, move around the pivoting cam 216 in accordance with the path dictated by follower 215.

The cam 216 is biased such that it attempts to move in a counter clockwise direction about thet pivot 220 on its triangular support 219. Thus, it will be seen that a very effective lifting off of the bars and gentle transfer as the bar moves along the surface 225 and is passed to the surface 212 is accomplished upon energization of the hydraulic actuater 207 by the electrical and hydraulic circuits.

Figure 14A:
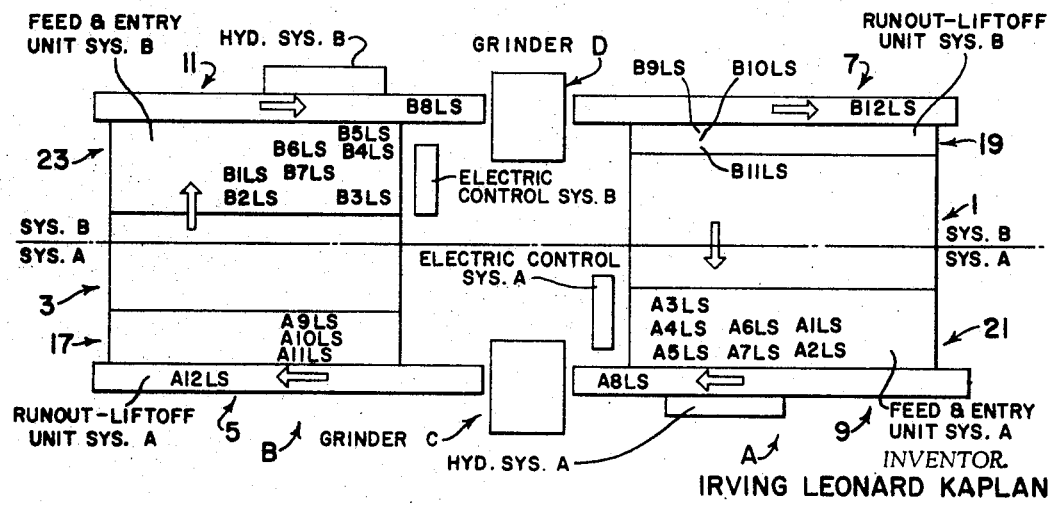
FIG. 14(a) is a control diagram layout of the FIG. 1 arrangement.

Turning now to FIGS. 14, 14a it will be seen that 12 types of limit switches are placed on each unit of the machine to provide both manual and automatic operation of the device. In the diagram the term "feed-a-bar control" is a coined phrase for referring to the bar loader 25 and the bar loader 27.

The schematic control diagram set for up for the centerless grinders C and D is seen in FIGS. 14–16. For clarity of illustration, the device is broken up into system A comprising entry table 9, grinder C and run-out table 5 and system B which includes entry table 11, grinder D and run-out table 7.

The description of the controls for the unit A or machine A is consistent with the previous discussion of a single side of the arrangement for two centerless grinders, but two systems, namely, system A and system B, each involving a portion of unit A and a portion of unit B are involved.

When bars are placed in the feed cradle 1, the feed cradle is down and the barrier arm 22 will be up. The slope of the feed cradle wear plates 70 is such that it increases out of a generally horizontal direction to a sharper downward direction toward the magazine 21 in the neighborhood of the funneling member 49. With the bars on the rail 70, the feed cradle is moved up by actuation of the hydraulic orbit motor mounted on the end of shaft 68 (not shown). Geared rotary switches A1LS and A2LS, as seen in FIG. 14 are attached to the shaft 68 wired in the control circuit through the main control panel to control the orbit motor which drives jack 65 and thereby raises and lowers feed cradle 1.

A limit switch A3LS is a proximity switch which senses the presence of a bar at the entrance of magazine 21 and, therefore, is closed if a bar is there at the "high level" in the magazine 21. The limit switch A4LS is a proximity switch of the switch 200 type in system A which indicates whether there are any bars in the lower area of the bar magazine 21. The proximity switch A5LS indicates whether there is a bar present at the pick up point or "low level" of magazine 21 to engage the pick-off arm 110 of the bar loader 25. The switch A6LS and A7LS are mechanical switches which are on shaft 102 and are limit switches for the advance and contraction of the shaft 102 in its rocking motion as obtained from the actuating cylinder 106. The limit switch A8LS indicates the presence of a bar on the work rolls 35 of table 9. A8LS is a switch positioned as switch 200 is shown positioned on entry table 9.

The shaft 206 which operates the unloader 13 is actuated by the hydraulic actuator 207. The actuator 207, which is preferably of the dual action rotary vane type, is controlled by mechanical limit switches B9LS, B10LS and B11LS of system B on unit A. These switches are commercially available as "Allen-Bradley No. 802 T.D.P." The bar lift-off or elevator device 13 is actuated by the presence of a bar on run-out table 7 being sensed by proximity switch B12LS, mounted on said table below the longitudinal path of travel of the bar.

Equivalent limit switches will be found in unit B with the run-out table 5 and unloader 15 of unit B in the control system A and with the entry table 11 and run-out table 7 of unit B in the control system B.

In FIGS. 14 to 16, the schematic electrical and hydraulic circuit interconnections, including the controllers between the limit switches and the solenoids for the hydraulic system which they control to accomplish the functions, are set forth schematically. Thus, it will be seen that in FIG. 14, for the control system A, a box schematically showing the layout of the limit switches and the members which they operate, is shown. In FIG. 14, for example, geared rotary limit switches, A1LS and A2LS on shaft 68, sense the condition of jack 65 through the controller and the feed cradle control of system A and is interlocked with limit switches A3LS, A4LS, and A5LS which are proximity switches for sensing the presence of bars in the magazine 21 and their location therein. The limit switch A3LS senses the bars located high in the magazine 21. A4LS senses bars down lower in the magazine and the limit switch A5LS senses a bar that is in precise location for being picked off by the element 110 of the bar loader or "Feed-a-bar" 25.

Limit switches A6LS and A7LS are mechanical switches tied to the shaft 102 to determine the cycle of the loader 25 and actuate the cylinder 106.

LIMIT SWITCH FUNCTIONS

| Unit No. & Sys. No. | Switch Function | Type of Switch | Switch No. |
|---|---|---|---|
| A, A | Cradle (Feed) Down | Geared Rotary | 1LS |
| A, A | Feed Cradle Up | do | 2LS |
| A, A | Bar Entry and High Level | Proximity | 3LS |
| A, A | Bar Low-Level | do | 4LS |
| A, A | Bar Presence at Pickup Point | do | 5LS |
| A, A | Feed-A-Bar Advanced | Mechanical | 6LS |
| A, A | Feed-A-Bar Retracted | do | 7LS |
| A, A | Bar Presence on Work Rolls | Promimity | 8LS |
| A, B | Unloader-Liftoff Arm Up | Mechanical Shft. 206 | 9LS |
| A, B | Unloader-Liftoff Arm Down | do | 10LS |
| A, B | Unloader-Liftoff Arm Ready | Mechanical | 11LS |
| A, B | Bar Liftoff Signal Switch on Table 7 | Proximity | 12LS |

The limit switch A8LS is the illustrated switch 200 in FIG. 6, for instance, and is mounted on a bracket on entry table 9 and senses the presence of a bar at that point. These limit switches, through the illustrated circuit and controller, actuate the solenoids in a sequence indicated in the chart below in a manner that will be readily understood by those skilled in the art.

when the controller is set on automatic, the feed cradle oscillates to continually present bars from the contoured rail 70 into the magazine 21. At the same time, as long as there are bars present and feeding properly, the controller automatically actuates the solenoid 3 which runs the work rolls 35 of the entry table 9. The hydraulic system is interlinked so that when there is available pres-

SOLENOID OPERATING SEQUENCE

| Function | Solenoid Numbers | | | | | | | | | | | | |
|---|---|---|---|---|---|---|---|---|---|---|---|---|---|
| | 1 | 2 | 3 | 4 | 5 | 6A | 6B | 7A | 7B | 8A | 8B | 9A | 9B |
| Idle All Functions | All Solenoids De-energized | | | | | | | | | | | | |
| Load Pump "A" | (*) | | | | | | | | | | | | |
| Load Pump "B" | | (*) | | | | | | | | | | | |
| Load Pump "C" | | | (*) | | | | | | | | | | |
| Run Work Rolls 35 on Entry 9 and Runout 7 Tables. (Manual and Auto.) | | | | | | (*) | | | | | | | |
| Raise Feed Cradle "Slow" (Manual and Auto.) | (*) | | | | (*) | | | | | | | | |
| Raise Feed Cradle "Fast" (Manual, only) | (*) | (*) | | (*) | (*) | | | | | | | | |
| Lower Feed Cradle "Slow" (Manual, only) | (*) | | | | (*) | | | | | | | | |
| Lower Feed Cradle "Fast" (Manual and Auto.) | (*) | (*) | | (*) | (*) | | | | | | | | |
| Raise Discharge Cradle "Slow" (Manual, only) 19 | (*) | | | | | | | (*) | | | | | |
| Raise Discharge Cradle "Fast" (Manual, only) 19 | (*) | (*) | | (*) | | | | (*) | | | | | |
| Lower Discharge Cradle "Slow" (Manual, only) 19 | (*) | | | | | | | (*) | | | | | |
| Lower Discharge Cradle "Fast" (Manual, only) 19 | (*) | (*) | | (*) | | | | (*) | | | | | |
| Raise Barrier Arms 33 (Manual, only) | (*) | | | | | | | | | (*) | | (*) | |
| Lower Barrier Arms 33 (Manual, only) | (*) | | | | | | | | | | | | |
| Pickup Bar From Magazine 24 (Manual and Auto.) | | (*) | | | | (*) | | | | | | | |
| Lower Bar to Work Rolls 25 (Manual and Auto.) | | (*) | | | | | | | | | | | |
| Liftoff Bar From Work Rolls 13 (Manual and Auto.) | | (*) | | | | | | | | | (*) | | |
| Retract Liftoff Arms 13 and Fold (Manual and Auto.) | | (*) | | | | | | | | | | | (*) |
| Extend Liftoff Arms 13 and Reset (Manual and Auto.) | | (*) | | | | | | | | | | (*) | |

*Denote solenoid energized.

It will be seen from the schematic control diagrams that the emergency switches 194 mounted on the run-out tables 5 and 7 are connected to the main power control of each system so that if a bar overruns one of the run-out tables, because one of the limit switches or other components of the lift-off devices fails, the emergency stop switch 194 involved, will cut off the main power and stop all functioning of the machine.

When the machine is on automatic cycle, the positioning of bars on the rail 70, in a bundle, starts the bars rolling down to the magazine 21 where they are sensed by the three proximity switches of the magazine. There is a control interlock by which the feed cradle control moves the feed cradle up or down to present more bars to the magazine if insufficient bars are present in the magazine at any of the three sensed locations. Because of the contour of the wear surface 70 of the feed cradle 1, as soon as the magazine proximity switches sense an adequate supply of bars, the cradle control lowers the discharge cradle, by operation of solenoid 7B to slow down the bar feed rate. If feeding continues because of the slope of rail 70, and adequate bars feed on past the limit switches A4LS and A5LS, the feed cradle stays in a retracted position. If more bars are needed, this is sensed and the switches automatically raise the feed cradle. The solenoid operating sequence chart of FIG. 15 illustrates this action clearly.

There is a provision, as will be seen from the diagrams, for use of pressure not needed elsewhere in the hydraulic circuit to increase the speed of this lowering so that there will not be a jamming of the bars at the mouth of the magazine near the guide plate 49.

The cut-off at the end of each direction of movement of the discharge cradle is accomplished by limit switches A1LS and A2LS in association with the shaft 68. Thus, sure in the system, the solenoid 4 acts to move the cradle at greater speed than normal. This high speed function, however, may be eliminated.

It will be obvious to those skilled in the art that automatic cycling is applied in like manner by corresponding limit switches and solenoids to the lift-off arm actuating control. Switches B9LS, B10LS and B11LS operate mechanically from shaft 206 to start and cycle actuator 207 through its three positions. Thus, the lift-off device 13 and the power rollers 35 of the table 7 are included in the automatic system with proximity switch B12LS controlling the latter.

As will also be obvious from circuit diagram 16, each of the controls may be manually operated. It will also be seen in FIG. 15 that the fast raising of the feed cradles can be only manually accomplished. Similarly, the discharge cradle 19 and the barrier arm 33 may be set at a certain place throughout the function of the machine and, accordingly, are not automated since there is no necessity therefor. Once set, they will require the operator's attention only after a large change in bar inventory, for instance, the discharge cradle 19.

Where a direct transfer across a machine from the discharge cradle passed the barrier arm, into the feed cradle and to the magazine is desired, such as for moving bars directly from grinders C and D of FIG. 1, these elements need not be moved during the complete operation. Moreover, it is possible to set the barrier arm 33 and the discharge cradle 19, while still having unground stock in the feed cradle 1, to collect and keep segregated, the finished bars that have been ground through both machines C and D. The crane operator can then merely lift the bars from the discharge cradle 19 while bars are still being fed from feed cradle 1.

Thus, it will be seen that through the illustrated controls, the entire operation of the machine during a normal cycle can be automated or manually performed by an operator standing at a control cabinet. Either mode of operation permits a duplication of any desired helical path of a point on the surface of a bar. The total effect and versatility of the machine is such that from the one illustrated embodiment many variations for installation of single or multiple units will be obvious to those skilled in the art.

I claim:

1. A bar handling device comprising in combination: a magazine, powered rollers adjacent said magazine for longitudinally advancing the bars to a work station, means to store a plurality of bars to be fed to said magazine, said means to store including means to feed said plurality of bars laterally from said means to store to said magazine, means to align said bars in tangent parallel relation to each other within said magazine, means to pick up bars one at a time in sequence from said magazine, and means to lower said bars in substantially an arcuate path gently without dropping one at a time on to said powered rollers.

2. The bar handling device of claim 1 in which the powered rollers for longitudinally advancing said bars to a work station are driven from a common drive shaft enclosed within a housing to isolate it from environmental contaminants.

3. The bar handling device of claim 1 in which the powered rollers are pivotally mounted for selective skewing in pairs and are controlled by a single skew control means to produce a predetermined helical path of a point on the surface of a bar as the bar advances to a work station, said skew control means including a mechanical link means comprising a selectively rotated shaft, a nut driven by said shaft, a pivoted link driven by said nut, a longitudinally moving actuator means driven by an arm on said pivoted link, and a plurality of arms rigidly connected to said pivotally mounted rollers and pivotally connected to said actuator means in such a manner that the longitudinal movement generated in said actuator means by said shaft, nut and pivoted link pivots said rollers to the desired degree of skewing.

4. The bar handling device of claim 1 in which the powered rollers to advance the bars longitudinally to a work station are mounted on a common support means, said support means being suspended on a selectively vertically moveable member, means for selectively moving said member to vary the height of the path of longitudinal movement of said bars.

5. The bar handling device of claim 1 in which the powered rollers to advance the bars longitudinally to a work station are mounted on a common support means, said support means being mounted on a selectively horizontally moveable member, and means in combination with said support means for selectively horizontally moving said support means.

6. The bar handling device of claim 1 in which the combination includes a bridge means and a base frame means and said magazine includes upper guide plates mounted on said bridge means, lower guide plates mounted on said base frame means, said bridge means having supports mounted on said base frame means for selective movement in a vertical direction relative thereto, means for selectively moving said bridge means a predetermined amount to accommodate bars of different diameter in the magazine between the upper and lower guide plates, and means to adjust said means to pick up bars a predetermined amount in response to movement of said bridge means to accommodate the diameter of bar for which the magazine is set.

7. The bar handling device of claim 1 in which a bar guide cam means is provided to determine the lateral path of travel of the bars when in engagement with the means to pick up bars, said cam means being moveably mounted opposite said magazine for adjustment laterally toward or away therefrom to provide for gentle lateral passing of bars of different diameter to said powered rollers.

8. The bar handling device of claim 1 which includes in combination therewith, means to laterally pass said bars from said means to pick up bars to said means to lower said bars gently.

9. The bar handling device of claim 1 which includes in combination therewith, means to receive longitudinally moving bars one at a time, means to store a plurality of received bars adjacent to and selectively communicated with said means to store a plurality of bars to be fed to said magazine, and means to lift said received bars from their path of longitudinal travel and move said bars to said means to store a plurality of received bars, said means to lift said received bars including arm means which rock upwardly across said path of travel and downwardly between said path of travel and the axis of rotation of said arms such that after one bar is lifted another bar can be received in its place without waiting for said means to lift said bars to be returned to its original position or to be rotated full circle.

10. The bar handling device of claim 9 in which the means to receive longitudinally moving bars one at a time includes powered rollers supported thereon, means to control the rotational and axial speed at which bars move on both the powered rollers adjacent said magazine and the powered rollers for receiving longitudinally moving bars such that any desired helical path of a point on the surface of a bar can be produced, and means selectively to raise and lower said means supporting said rollers for receiving longitudinally moving bars.

11. The bar handling device of claim 10 in which the means to control the rotational and axial speed at which bars move on said powered rollers is a mechanical linkage driven by a selectively rotatable threaded shaft and nut to skew the rollers at different angles to the path of longitudinal movement of the bars.

12. The bar handling device of claim 1 which includes in combination therewith, means to receive longitudinally moving bars one at a time, means to store a plurality of received bars adjacent to and selectively communicated with said means to store a plurality of bars to be fed to said magazine, and means to lift said received bars from their path of longitudinal travel and move said bars to said means to store a plurality of received bars.

13. The bar handling device of claim 12 which includes in combination therewith, moveable barrier means to permit selective separation and communication between said means to store a plurality of received bars and said means to store a plurality of bars to be fed to a magazine.

14. The bar handling device of claim 13 which includes in combination therewith means to move a plurality of bars laterally from said means to store a plurality of received bars to said means to store a plurality of bars to be fed to a magazine.

15. The bar handling device of claim 14 in which the means to move a plurality of bars laterally from said means to store a plurality of received bars to said means to store a plurality of bars to be fed includes means for selectively moving both of said means upwardly and downwardly relative to said magazine.

16. The bar handling device of claim 15 in which separate means for moving the means to store bars to be fed and the means to store received bars are provided.

17. The bar handling device of claim 16 in which the means to store bars to be fed comprises a plurality of rails, each of said rails having a sloped upper bar engaging contour of increasing steepness in the direction of the magazine, and each of the bar engaging surfaces on each of the rails and each of the bar engaging surfaces of all of the other bar handling elements, are of a material which is softer than the material of which the bars being handled are made.

18. The bar handling device of claim 12 in which the arm means to lift said received bars from their path of longitudinal travel includes an end portion which is pivoted for limited movement in an upward direction from the rocking major portion of the arm means, said end portion having a cam follower thereon for following a generally upstanding crescent shaped pivoted cam which is biased at its upper end in a direction away from the axis of rotation of said major arm portion, said cam follower upon upward movement of said arm maintaining said pivoted end portion extended so as to cut across the path of longitudinal travel of said bar while the upper end of said cam pivots away from said path, and said follower upon reaching the upper apex of said crescent-shaped cam following the convex curve thereof downwardly as the upper portion of said cam pivots outwardly toward said path, thereby pivoting said end portion of said arm upwardly relative to said major arm portion and away from said path as said arm rocks downwardly to its original position, and said follower upon reaching the lower apex of said crescent freezing said cam for pivoting to its biased position and pivoting said end portion to its extended original position below the path of travel of said bars as said major arm portion is returned to its original position.

19. The bar handling device of claim 12 in which the means to receive longitudinally moving bars one at a time includes powered rollers supported thereon, means to control the rotational and axial speed at which bars move on both the powered rollers adjacent said magazine and the powered rollers for receiving longitudinally moving bars such that any desired helical path of a point on the surface of a bar can be produced.

20. A bar handling device comprising in combination: a magazine, powered rollers adjacent said magazine for longitudinally advancing the bars to a work station, means to store a plurality of bars to be fed to said magazine, said means to store including means to feed said plurality of bars laterally from said means to store to said magazine, means to align said bars in tangent parallel relation to each other within said magazine, means to pick up bars one at a time in sequence from said magazine, bar guide cam means to determine the lateral path of travel of the bars when in engagement with said means to pick up bars, said cam means being moveably mounted opposite said magazine for adjustment laterally toward or away therefrom to provide for bars of different diameter, and means to lower said bars from said bar guide cam means gently one at a time on to said powered rollers.

21. A bar handling device comprising in combination: a base frame means, a bridge means, a magazine, powered rollers adjacent said magazine for longitudinally advancing the bars to a work station, means to store a plurality of bars to be fed to said magazine, said means to store including means to feed said plurality of bars laterally from said means to store to said magazine, means to align said bars in tangent parallel relation to each other within said magazine, said means to align including upper guide plates mounted on said bridge means and lower guide plates mounted on said base frame means, said bridge means having supports mounted on said base frame means for selective movement of said bridge means in a vertical direction relative thereto, means for selectively moving said bridge means a predetermined amount to accommodate bars of different diameter in the magazine between the upper and lower plates, means to pickup bars one at a time in sequence from said magazine, bar guide cam means to determine the lateral path of travel of the bars when in engagement with the means to pick up bars, said cam means being moveably mounted opposite said magazine for adjustment laterally toward or away therefrom to provide for bars of different diameter, said cam means being mounted for movement in response to movement of said means for selectively moving said bridge a predetermined amount to accommodate bars of different diameter, means to lower said bars from said bar guide cam means gently one at a time onto said powered rollers.

22. A bar handling device comprising in combination: a magazine, powered rollers adjacent said magazine for longitudinally advancing the bars to a work station, means to store a plurality of bars to be fed to said magazine, said means to store including means to feed said plurality of bars laterally from said means to store to said magazine, means to align said bars in tangent parallel relation to each other within said magazine, means to pick up bars one at a time in sequence from said magazine, means to lower said bars gently one at a time on to said powered rollers, said means to pick up bars being capable of rocking in one direction of rotation to pick up a bar from said magazine and lift said bar to a position substantially over the longitudinal path of travel of said bars, said means to lower said bars being capable of rocking simultaneously therewith in the opposite direction of rotation to a position substantially over the longitudinal path of travel of said bars, means to laterally pass said bars from said means to pickup bars to said means to lower said bars, said means to laterally pass said bars including a bar guide means for gently directing and supporting said bars in lateral movement from said means to pick up bars to said means to lower said bars gently when both of said means are rocked to said positions substantially over the longitudinally path of travel of said bars.

References Cited

UNITED STATES PATENTS

| | | |
|---|---|---|
| 1,726,139 | 8/1929 | Blasco et al. |
| 2,043,556 | 6/1936 | Protin. |
| 1,319,000 | 10/1919 | Holbein _____ 214—339 XR |
| 2,525,305 | 10/1950 | Lombard. |
| 3,306,472 | 2/1967 | Blanz. |

FOREIGN PATENTS

| | | |
|---|---|---|
| 1,348,597 | 12/1963 | France. |

GERALD M. FORLENZA, Primary Examiner

F. E. WERNER, Assistant Examiner

U.S. Cl. X.R.

214—339